United States Patent [19]

Nelson et al.

[11] Patent Number: 4,938,563
[45] Date of Patent: Jul. 3, 1990

[54] HIGH EFFICIENCY CUBE CORNER RETROFLECTIVE MATERIAL

[75] Inventors: John C. Nelson; Mark E. Gardiner, both of Santa Rosa, Calif.; Roger H. Appeldorn, White Bear Lake, Minn.; Timothy L. Hoopman, River Falls, Wis.

[73] Assignee: Minnesota Mining and Manufacturing Company, St. Paul, Minn.

[21] Appl. No.: 197,107

[22] Filed: May 20, 1988

Related U.S. Application Data

[63] Continuation-in-part of Ser. No. 933,470, Nov. 21, 1986, Pat. No. 4,775,219.

[30] Foreign Application Priority Data

Oct. 21, 1987 [CA] Canada ................................. 549817

[51] Int. Cl.$^5$ ..................... G02B 5/124; G02B 5/136
[52] U.S. Cl. .................................... 350/103; 350/109; 350/320
[58] Field of Search ............... 350/102, 103, 109, 100, 350/129, 97, 613, 618, 622, 320

[56] References Cited

U.S. PATENT DOCUMENTS

| | | | |
|---|---|---|---|
| Re. 29,396 | 9/1977 | Heenan | 350/102 |
| 3,712,706 | 1/1973 | Stamm | 350/103 |
| 3,817,596 | 6/1974 | Tanaka | 350/103 |
| 3,833,285 | 9/1974 | Heenan | 350/103 |
| 3,923,378 | 12/1975 | Heenan | 350/102 |
| 4,066,236 | 1/1978 | Lindner | 249/160 |
| 4,073,568 | 2/1978 | Heasley | 350/103 |
| 4,189,209 | 2/1980 | Heasley | 350/103 |
| 4,202,600 | 5/1980 | Burke et al. | 350/103 |
| 4,208,090 | 6/1980 | Heenan | 350/61 |
| 4,243,618 | 1/1981 | Van Arnam | 264/1 |
| 4,349,598 | 9/1982 | White | 428/161 |
| 4,460,449 | 7/1984 | Montalbano | 204/281 |
| 4,576,850 | 3/1986 | Martens | 428/156 |
| 4,582,885 | 4/1986 | Barber | 528/28 |
| 4,588,258 | 5/1986 | Hoopman | 350/103 |
| 4,672,089 | 6/1987 | Pricone et al. | 524/354 |

FOREIGN PATENT DOCUMENTS 156406 7/1952 Australia.

OTHER PUBLICATIONS

Eckhardt, H. D., "Simple Model of Corner Reflector Phenomena", *Applied Optics*, Jul., 1971, pp. 1559-1566.
Rityn, N. E., "Optics of Corner Cube Reflectors", *Theory and Experiment*, UDC 538.318:531.719.24, pp. 198-201.
Yoder, P. R., Jr., "Study of Light Deviation Errors in Triple Mirrors and Tetrahedral Prisms", *Journal of the Optical Society of America*, vol. 48, No. 7, Jul., 1958, pp. 496-499.

Primary Examiner—Bruce Y. Arnold
Assistant Examiner—Ronald M. Kachmarik
Attorney, Agent, or Firm—Donald M. Sell; Walter N. Kirn; Robert H. Jordan

[57] ABSTRACT

The present invention provides a retroreflective material which is efficient at high angles of incidence and which may be individually tailored so as to distribute light retroreflected by the material into a desired pattern or divergence profile. The retroreflective material of the present invention comprises a transparent surface layer having a front side and a back side and an array of cube corner reflective elements, each of the reflecting elements including a rectangular base on the back side of the surface layer, two rectangular faces nearly perpendicular to each other each one being joined to an edge of the rectangular base to form a reflecting element having a triangular cross section, and two triangular faces that are approximately parallel to each other and approximately perpendicular to the rectangular faces, and forming the ends of the reflecting elements; and the triangular and rectangular faces defining a pair of approximate cube corners therebetween, the reflecting elements arranged with their bases adjacent to the surface layer. The terms "approximately parallel" and "approximately perpendicular" are used herein to refer to faces which are truly parallel or perpendicular and faces which have small variations from true parallelism or perpendicularity.

23 Claims, 3 Drawing Sheets

HIGH EFFICIENCY CUBE CORNER RETROFLECTIVE MATERIAL

This application is a continuation-in-part of U.S. Ser. No. 933,470 filed Nov. 21, 1986, now U.S. Pat. No. 4,775,219.

FIELD OF THE INVENTION

The present invention is directed to cube-corner retroreflective articles, particularly to such articles which are efficient at high incidence angles and which may be tailored so as to distribute light retroreflected by the material into a desired pattern or divergence profile.

BACKGROUND OF THE INVENTION

Retroreflective materials which employ cube-corner type reflecting elements are now well-known in the art. Cube-corner reflecting elements are trihedral structures which have three mutually perpendicular lateral faces meeting at a single corner, such as that configuration defined by the corner of a room or a cube. The retroreflectivity typically achieved by cube-corner type reflecting elements is through the principle of total internal reflection. A transparent cube-corner element receives a ray of incident light at an angle and sends it back in the same direction. See, for example, U.S. Pat. Nos. 3,924,929, 4,672,089, 4,349,598, and 4,588,258.

The light reflected by retroreflective articles back toward the source of the light has generally been spread into a cone-like pattern centered on the path the light traveled to the reflector; such a spreading has been necessary so that, for example, light from the headlamps of an oncoming vehicle, reflected back toward the vehicle by a retroreflective sign, will diverge sufficiently to reach the eyes of the driver, who is positioned off-axis from the headlamp beam. In conventional cube-corner retroreflective articles, this cone-like spreading of retroreflected light is obtained through imperfections in the cube-corner retroreflective elements (e.g., non-flatness of the faces, unintended tilting of the faces from the mutually perpendicular positions, etc.) and through diffraction caused by retroreflected light exiting through an aperture defined by the base edges of the three reflecting faces (see Stamm U.S. Pat. No. 3,712,706).

However, the spreading of light from cube-corner retroreflective articles has deficiencies: the cone of retroreflected light is often too narrow for many uses that require reflected light to be seen farther off-axis; and the three-sided nature of the cube-corner retroreflective elements gives the retroreflected cone of light an undesirable asymmetric shape, with the result that cube-corner retroreflective articles suffer from a variation in retroreflective brightness when viewed from different presentation angles (a glossary of terms is at the end of the specification). These deficiencies can be sufficiently severe that two persons sitting side-by-side in a vehicle passing a sign covered with cube-corner retroreflective sheeting may have distinctly different perceptions as to the brightness of the sign.

Tanaka, U.S. Pat. No. 3,817,596 increases the divergence or spreading of light rays from a cube-corner retroreflective article by deliberately tilting the faces of the cube-corner retroreflective elements out of perpendicularity or orthogonality. As taught in papers such as P. R. Yoder, "Study of Light Deviation Errors in Triple Mirrors and Tetrahedral Prisms," *Journal of the Optical Society of America*, Vol. 48, No. 7, July, 1958; N. E. Rityn, "Optics of Corner Cube Reflectors," *Soviet Journal of Optical Technology*, Vol. 34, p. 198 et seq and H. D. Eckhardt, "Simple Model of Corner Reflector L Phenomena", *Applied Optics*, Vol. 10, No. 7, July, 1971, such a tilting of the faces results in light reflected by the cube-corner retroreflective element being divided into as many as six different beams that diverge away from the reference axis of the element and thereby spread the light through a broader range of angles.

Although the spreading of light taught in U.S. Pat. No. 3,817,596 increases the observation angles from which the article may be seen by retroreflection, no effort is made to avoid the basic asymmetry that arises from the three-sided nature of a cube-corner retroreflective element. Further, the spreading reduces retroreflective brightness at commonly experienced smaller observation angles, i.e., the narrow angles near the reference axis, because the light that would ordinarily have been directed to such smaller observation angles is spread through an enlarged region of space. Much of the spread light is wasted, since the article will generally not be viewed from points throughout the enlarged space, and this lost light leaves the retroreflective brightness of the article significantly reduced (see FIG. 6 of U.S. Pat. No. 3,817,596).

Heenan, U.S. Pat. No. 3,833,285, changes the divergence or spreading of light from a cube-corner retroreflective article in a different manner, specifically by incorporating into the article a set of special cube-corner retroreflective elements arranged in a row.

A disadvantage of a retroreflective article as taught in U.S. Pat. No. 3,833,285 is the fact that, in many retroreflective articles, such as traffic control signs, it could be distracting to have a single isolated row of retroreflective elements that distributes light in patterns that are noticeably different from those of other retroreflective elements of the article. For example, instead of seeing a uniformly lit retroreflective sign, an observer would see variations in brightness that could distract from an understanding of the information carried on the sign. Further, a product as described in U.S. Pat. No. 3,833,285 required the precise manufacture of individual pins that are subsequently bundled together to form the row of elements, and it is difficult to precisely form and group together such distinct pins to obtain retroreflection within desired tolerances.

A need exists for an improved retroreflective material which may be individually tailored so as to distribute light retroreflected by the material into a desired pattern or divergence profile and which is efficient at high angles of incidence.

SUMMARY OF THE INVENTION

The present invention provides a retroreflective material which is efficient at high angles of incidence and which may be individually tailored so as to distribute light retroreflected by the material into a desired pattern or divergence profile.

The retroreflective material of the present invention comprises a transparent surface layer having a front side and a back side and an array of cube corner reflective elements, each of the reflecting elements including a rectangular base on the back side of the surface layer, two rectangular faces nearly perpendicular to each other each one being joined to an edge of the rectangular base to form a reflecting element having a triangular cross section, and two triangular faces that are approximately parallel to each other and approximately perpendicular to the rectangular faces, and forming the ends of the reflecting elements; and the triangular and rectangular faces defining a pair of approximate cube corners therebetween, the reflecting elements arranged with their bases adjacent to the surface layer. The terms "approximately parallel" and "approximately perpendicular" are used herein to refer to faces which are truly parallel or perpendicular and faces which have small variations from true parallelism or perpendicularity.

The reflecting elements are formed by two perpendicular intersecting sets of parallel grooves, the first set being V-shaped, and the second set of grooves each having a pair of faces each of which is nearly perpendicular to the rectangular base. The first set of grooves forms the rectangular faces and the second set of grooves forms the triangular faces of the reflecting elements. At least one of the sets of grooves includes more than one groove having a groove side angle that differs from another groove side angle of the same set by a small amount (less than 3°, usually less than 1°).

These differences in groove side angles can occur in a repeating pattern or sequence. As a consequence of the variation in groove side angle, the cube corner retroreflective elements have small variations in at least one of the dihedral angles between the faces from one reflecting element to another, the variations existing in at least some but not necessarily all of the reflecting elements. Thus is formed a plurality of cube corner retroreflective elements of a plurality of distinct shapes. At least one of the distinctive shapes is for a nonorthogonal cube corner retroreflective element, by which it is meant that at least one face of the element is tilted at an angle that differs from the angle which would be required for all dihedral angles within the element to be orthogonal; even though the dihedral angles are not all orthogonal, such an element is still regarded as a cube corner retroreflective element herein, because it closely resembles the ideal cube corner retroreflective element in shape and function.

The distinctively shaped cube corner retroreflective elements retroreflect incident light in distinctively shaped light patterns. The overall pattern of the light retroreflected by an article of the invention, i.e. divergence profile for the article, can be designed by specifying the variations in groove side angles. A practical benefit for signs is that they can be designed with a divergence profile that returns the light to the observer area, rather than back into the headlights of his car. That is, the divergence profile can be spread out.

With the repeating pattern of groove angle variations mentioned above which is preferred, the array of reflecting elements is divided into repeating sub-arrays that each comprise a plurality of cube corner reterorflective elements of a plurality of different shapes. The divergence profile comprises a summation of the different light patterns in which the distinctively shaped cube corner retroreflective elements in a subarray retroreflect incident light, and the individual distinctive shaped light patterns can be selected to give the overall pattern a desired shape.

The present invention also provides a method for preparing a tool from which cube-corner retroreflective articles are formed, comprising forming in tool stock at least one set of parallel grooves that define at least some lateral faces of the cube corner elements, at least one of the grooves being varied to an angle different by a predetermined small amount from the angle required to provide orthogonal cube-corner elements.

DETAILED DESCRIPTION OF THE PRESENT INVENTION

Figure 1:
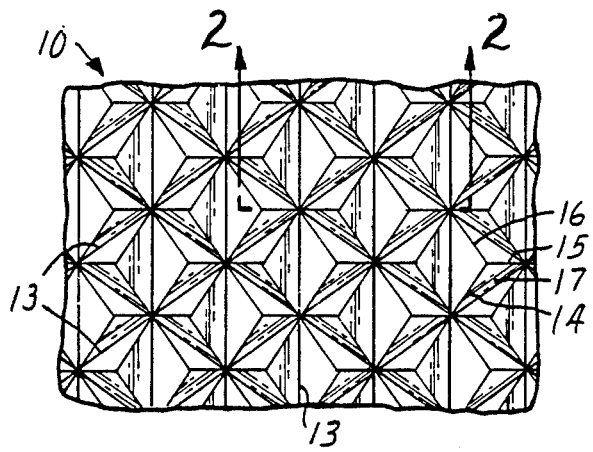
FIG. 1 is a plan view of the back of retroreflective elements produced by the method of the invention formed by three intersecting sets of parallel V-shaped grooves.
Figure 2:
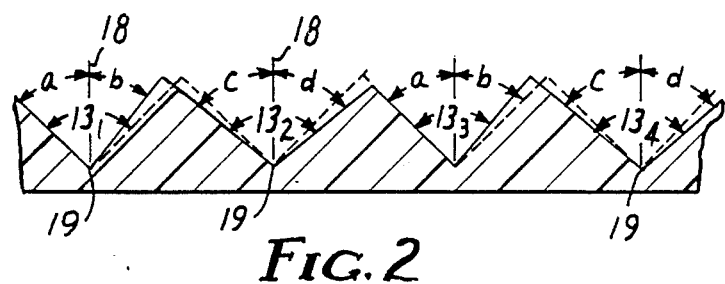
FIG. 2 shows part of a representative set of grooves having groove side angles that differ in an exaggerated manner from other groove side angles of the same set.

A representative retroreflective sheet material 10 manufactured from tooling made by the method of the invention is shown from the back of the sheet material in FIG. 1 and in section in FIG. 2. As shown in FIG. 1, the configured back surface of the sheet material 10 is defined by three intersecting sets 11, 12, and 13 of parallel V-shaped grooves which form a dense or fully packed array of cube-corner retroreflective elements. The angles for the sides of the grooves, i.e., the groove side angles, are chosen so that the dihedral angles formed at the lines of intersection of the grooves, e.g, the lines 14, 15 and 16 for the representative cube-corner retroreflective element 17 in FIG. 1, are approximately 90°. However, at least one of the intersecting sets of parallel grooves includes, in a repeating pattern, grooves having one or both groove side angles different from at least one other groove side angle of the same set. By "repeating pattern," it is meant that a particular distinctive groove side angle(s) occurs periodically across the array of cube-corner retroreflective elements, i.e., is spaced the same number of grooves from its previously occurring position in the array.

FIG. 2 shows part of a representative set of grooves having groove side angles that differ in an exaggerated manner from other groove side angles of the same set. Specifically, FIG. 2 shows a set of grooves 13 from the sheet material of FIG. 1, i.e., $13_1$, $13_2$, $13_3$, and $13_4$. In this set of grooves, there are four different groove side angles "a," "b," "c," and "d," extending between the sides of the grooves and a plane 18 that is perpendicular to a plane defined by the bottom edges 19 of the grooves. The present invention also includes configurations wherein the bottom edges of the grooves are not coplanar. The groove side angles are arranged in an a-b-c-d-a-b-c-d repeating pattern. The groove side angle "a" in this representative set is an angle that would form an orthogonal dihedral angle at the intersection of the groove side with groove sides of the other two sets of grooves (such groove side angles are sometimes termed "orthogonal-producing" herein), and the groove side angles "b," "c," and "d" do not produce orthogonal dihedral angles. The position of the groove sides that would be orthogonal-producing is shown in dotted lines in FIG. 2, and as will be seen, the angle "b" is less than that needed to obtain orthogonality, and the angles "c" and "d" are larger than that needed to obtain orthogonality.

Figure 3:
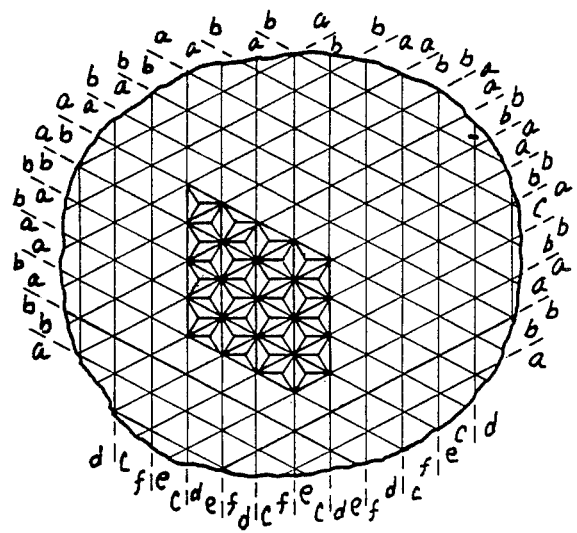
FIG. 3 is a schematic plan view of representative patterns of grooves for a retroreflective article made by the method of the invention.
Figure 4:
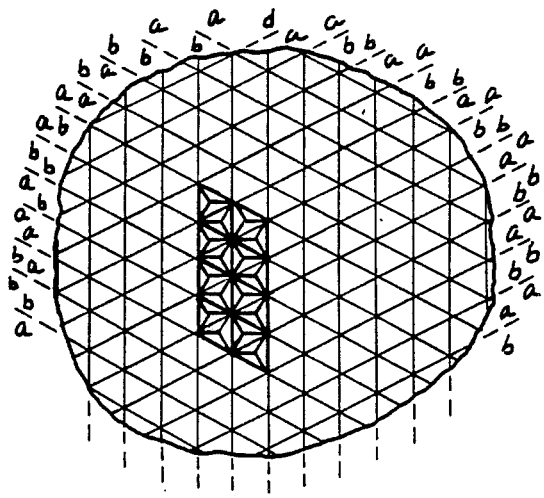
FIG. 4 is a schematic plan view of a representative pattern of grooves for a retroreflective article of the method of the invention.

FIGS. 3 and 4 show in schematic plan view representative patterns of grooves for a retroreflective article manufactured from tooling made by the method of the invention. In these figures, each line represents one V-shaped groove, with the letter on each side of a line representing the groove side angle on that side of the groove. As illustrated by these examples, each of the three sets of grooves can have a different repeating pattern of groove side angles. In FIG. 3, one set has an a-b-b-a pattern, a second set has an a-b-a-b-b-a-b-a pattern, and the third set has a c-d-e-f-d-c-f-e pattern. In FIG. 4 the different grooving patterns are, respectively, an a-b-b-a pattern, an a-b-a-b-b-a-b-a pattern, and a c-d-d-c pattern.

Figure 5:
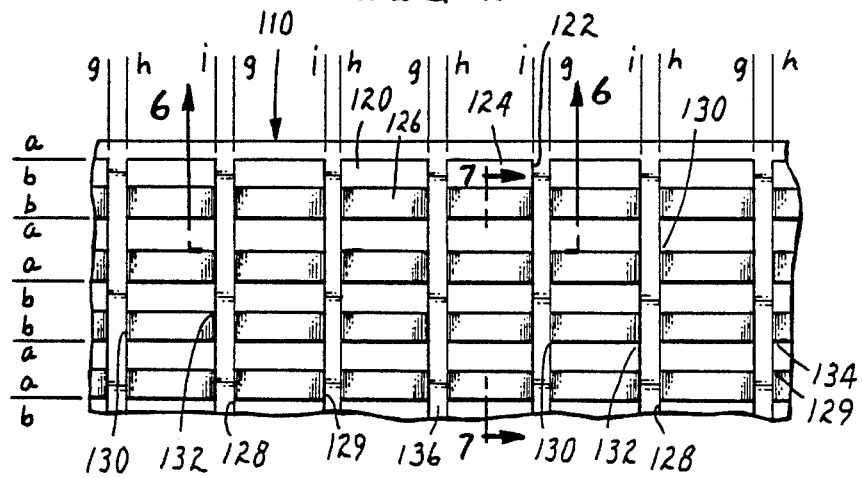
FIG. 5 is a fragmentary plan view of the back of retroreflecting elements of the invention.
Figure 6:
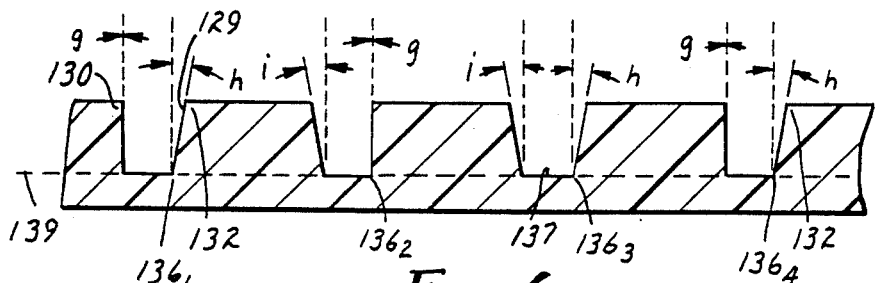
FIG. 6 represents a view similar to a vertical cross-section along line 6—6 of FIG. 5, but having groove side angles that differ in an exaggerated manner from another groove side angle of the same set; and, FIG. 7 is a cross-section along line 7—7 of FIG. 5.
Figures 7, 8:
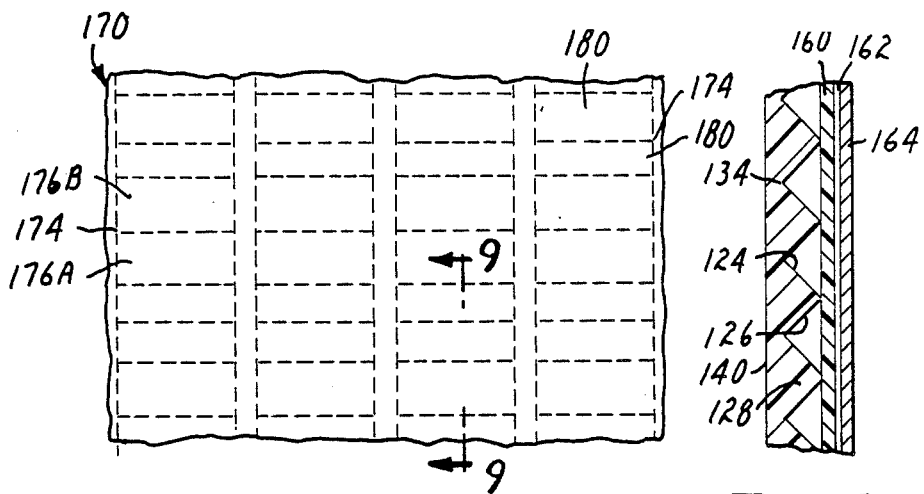
FIG. 8 is a fragmentary plan view of a canted bisector embodiment of the present invention.

Referring to FIGS. 5-7, a retroreflective material 110 of the present invention is shown having reflecting elements 120. Reflecting elements 120 include a rectangular base 122, a pair of rectangular faces 124 and 126 and a pair of approximately perpendicular triangular faces 128 and 129. The triangular faces 128 and 129 lie nearly perpendicular to the base 122. Typically, the rectangular base is less than or equal to 0.5 mm long, and the intersection of the rectangular faces 124 and 126 is less than 0.2 mm from the base.

The rectangular faces 124 and 126 and the triangular faces 128 and 129 form cube corners 130 and 132 as will be discussed in greater detail herein. The cube corners 130 and 132 are referred to as cube corners regardless of whether they are orthogonal or non-orthogonal cube corners.

The reflecting elements 120 are uniformly arranged in rows, as shown in FIG. 5, with the triangular faces 128 adjacent to the triangular faces 129 of neighboring reflecting elements 120. The rectangular faces 124 and 126 form a first V-shaped groove 134. The triangular faces 128 and 129 form a second groove 136 having as its approximately perpendicular faces the triangular faces 128 and 129. The first groove 134 and the second groove 136 are perpendicular to each other, as shown in FIG. 5.

As shown in FIG. 7, the retroreflective elements 120 are formed on the back side of a transparent surface layer 140. The elements 120 are attached to a backing material 160 which has an adhesive layer 162, which is used to attach the retroreflective material 110 to a signing material 164.

This retroreflector is like that of White, U.S. Pat. No. 4,349,598 (which is incorporated by reference herein), with an important difference. Namely, the dihedral angles of at least some of the cube corner elements are not 90°, but some angle slightly different from 90° by a difference of less than 1° usually. The amount of this difference varies so that, for example, one cube corner element may have a dihedral angle of 90°30' and the one next to it may have an 89°50' angle. There is a plurality of such variations in the retroreflector which is said to be multi-non-orthogonal. This feature helps to alleviate variations in the brightness of reflected light across the area of the retroreflector, and it results from variations in the grooves which form the cube corner elements.

The groove side angles of the first V-shaped groove 134 are approximately 45°. The groove side angles of the second groove 136 which has approximately perpendicular sides is approximately 0°. However, at least one of the intersecting sets of parallel grooves includes, preferably in a repeating pattern, grooves having one or both groove side angles different from at least one other groove side angle of the same set. Each retroreflective element of the sheet material of the invention has two cube corners. In some cases both cube corners will be identical, whereas in other situations the cube corners may be slightly different from one another with one or both of the cube corners being non-orthogonal.

FIG. 6 shows part of a representative set of grooves having groove side angles that differ in an exaggerated manner from other groove side angles of the same set. These grooves will be referred to as right angle channel cross section grooves, since they look approximately like the cross section of a channel having right angle corners or sides perpendicular to the bottom. Specifically, FIG. 6 shows a set of grooves 136 from the sheet material of FIG. 5, i.e. $136_1$, $136_2$, $136_3$, and $136_4$. In this set of grooves there are three different groove side angles "g", "h", and "i", extending between the sides of the grooves and a plane 139 that is perpendicular to a plane defined by the bottom edges 137 of the grooves. The groove side angles are arranged in an g-h-i-g-i-h-g-h repeating pattern.

The groove side angle "g" in this representative set is an angle that would, in this representative article, form an orthogonal dihedral angle at the intersection of the groove side with a groove of the other set of V-shaped grooves. The groove side angles "h", and "i" do not produce orthogonal dihedral angles. The position of the groove sides that would be orthogonal-producing is shown in dotted lines in FIG. 6. The angles "h" and "i" are larger than needed to obtain orthogonality.

The groove side angles of the set of V-grooves in an article of the present invention can be varied as described above in the discussion about FIG. 2. For example, an orthogonal cube corner would be formed by the intersection of two groove side angles "a", of FIG. 2, and a groove side angle "g" in FIG. 6.

FIG. 5 also shows a representative pattern of grooves for a retroreflective article of the invention. In this figure, each horizontal line at the left side of the figure represents one V-shaped groove with the letter on each side of a line representing the groove side angle on that side of the groove. The pairs of vertical lines each represent a second groove having approximately perpendicular sidewalls, with the letter on each side of a line representing the groove side angle on that side of the groove. As illustrated by this example, each of the two sets of grooves can have a different repeating pattern of groove side angles. In FIG. 5, first groove set has a "a-b-b-a" pattern, and the second set has a "g-h-i-g-i-h-g-h" pattern.

The preferred repeating patterns of grooves form periodically repeating groupings of cube-corner retroreflective elements, or sub-arrays, distributed across one large-area side of the retroreflective article. With the groove pattern shown in FIG. 5, sub-arrays consisting of potentially six distinctive cube-corner retroreflective elements are formed; i.e., assuming a, b, g, h, i are all different from one another, there are six cube-corner retroreflective elements of distinctive shape in the sub-array.

Instead of being repeated in the repeating patterns discussed above, groove side angles can be repeated more irregularly, e.g. 4, 6, and then 5 grooves between recurrences of a given side angle. In most retroreflective articles of the invention, there are a multitude of grooves, and a particular nonorthogonal groove side angle will be repeated numerous times (e.g., 10 or even 100 times or more). Also, in most retroreflective articles of the invention, a large number of the groove side angles (e.g., one-third or more), and often substantially all of the groove side angles, will be nonorthogonal. A particular groove side angle will usually be repeated within a rather short span of grooves, e.g., within a span of 10 or less grooves.

Since groove side angles may be adjusted or chosen independently from one another, there need not be pairs of elements, but instead, if desired, the elements can all be different from one another. The pairs of elements for the array of FIG. 5 occur because of the particular repeating patterns of grooves used in the array, e.g., by the rotation of the a-b pattern to a b-a pattern in an adjacent groove so that each element is matched by a similarly shaped element rotated 180° from the first element. Whatever repeating patterns are used, so long as the patterns are periodic, the sub-arrays will all be identical to one another.

It is not essential that all the groove side angles in a sub-array differ from one another. For example, in FIG. 3, c and e could be identical to one another, or other groove side angles could be identical. However, at least one of the two sets of grooves, and for greater control at least two of the sets of grooves (2 of 2 or 2 of 3) include at least one groove side angle that differs from at least one other groove side angle in the same set, with the result that a plurality (i.e., at least two) of the cube-corner retroreflective elements in a sub-array are distinctively shaped, i.e., have a shape different from one another. This difference in shape is more than simply a rotation of an element about its axis, such as the 180° rotation noted above or the similar 180° rotation of the cube-corner elements of U.S. Pat. No. 4,588,258, but instead arises, for example, because a particular face of a cube corner element is not orthogonal-producing.

A further description of the manner and results of tailoring the groove side angles is found in the parent application, Ser. No. 933,470, filed Nov. 21, 1986, which is incorporated herein by reference.

The individual groove side angles in each repeating pattern may be such as to produce orthogonality or non-orthogonality, though as noted, there will be at least one groove side angle in at least one set that is different from another groove side angle in the set, meaning that there must be at least one groove side angle in the set that is not orthogonal-producing. The amount of excess or deficiency from an angle that would be orthogonal-producing is generally a few arc-minutes, e.g., about 15-30 arc-minutes or less, though larger deviations can be used. Preferably, the chosen groove side angles are obtained in the tooling from which articles of the invention are molded to within plus-or-minus about one-half arc-minute, and more preferably, plus-or-minus one-fourth arc-minute. Some further deviation may occur during the molding operation, though preferably there is no more than a two or three arcminute change, and more preferably, no more than one or two arc-minutes change, during molding. The technique of forming a master for cube corner retroreflectors by cutting intersecting sets of parallel grooves in a flat metal surface with a V-shaped diamond tool is disclosed in U.S. Pat. No. 3,712,706, see for example column 3, lines 35-54, column 4, line 57-column 5, line 24, and column 17, line 25-column 22, line 47, all of which are incorporated herein by reference.

An advantage of the method of the invention is that when cutting a groove, all of the faces produced along each side of the groove have precisely the same angle. Also, this same face angle can be obtained quite precisely each time that the cutting tool is indexed over to repeat the same groove. This precision in the shaping of identical cube-corner retroreflective elements allows for a precise overlapping of the retroreflective light patterns from each cube-corner retroreflective element and, therefore, minimizes the divergence or discrepancy between cube-corner elements having the same optical design. Such interactive precision contributes to the controlled use of light so that light is directed only at intended angles.

Preferably, the grooves forming the configured surface of a retroreflective article of the invention extend continuously across a multitude of sub-arrays, with the many individual sub-arrays being created by the repeating pattern of the grooves. Such continuous grooves contrast with the formation of individual pins, each having the shape of an individual cube-corner retroreflective element, such as is used with large cube-corner retroreflective elements (see Heenan, U.S. Pat. No. 3,833,285), and also contrast with the procedure taught in Van Arnam, U.S. Pat. No. 4,242,618, in which an array comprising zones of differently oriented cube-corner retroreflective elements are provided by grooving a planar surface formed by a bundle of pins, then loosening the bundle, rotating the pins, and reassembling the bundle. The use of continuous grooves is advantageous because they are more convenient and less expensive to cut, and avoid disruption and loss of reflectivity at boundaries between zones.

The variation from orthogonality in a groove may be obtained by tilting or offsetting a V-shaped tool, such as a diamond-pointed tool, used to form a groove. The same tool may also be used to cut more than one set of grooves. The grooves having nearly perpendicular sides may be cut in a similar fashion.

Figure 9:
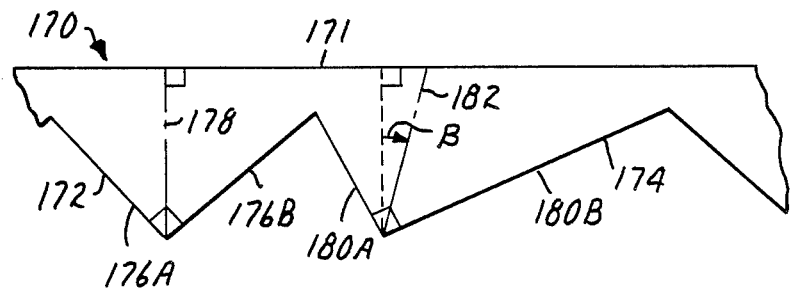
FIG. 9 represents a schematic view similar to a vertical section along the line 9—9 of FIG. 8.

Referring to FIG. 9, a schematic cross-section of an alternative embodiment of the present invention is shown. FIG. 8 shows a fragmentary plan view of the embodiment of FIG. 9. In FIGS. 8 and 9, a retroreflective material 170, which permits improved angularity in the horizontal direction, is shown. Such improved angularity is important, for example, in pavement markers, or vertical barrier delineators. Retroreflective material with low angularity will only brightly retroreflect light that impinges on it within a narrow angular range centering approximately on its optical axis. In a pavement marker positioned on a highway, the incident angle is the angle between the line of the light beam of the car headlights and a line perpendicular to the reflective sheeting surface in the pavement marker and the plane of the incident angle is defined by those two lines. Angularity is a property of the sheeting defined as the largest angle away from a line perpendicular to the reflecting surface of the pavement marker at which the marker will remain an effective retroreflector.

In FIG. 9, reflecting elements 172 and 174 having a base 171 are shown. Element 172 has a pair of tetragonal faces 176A and 176B which intersect to define a substantially perpendicular angle. A bisector 178 bisects the angle between the faces 176 and intersects the base 171 at a substantially perpendicular angle. This is a construction similar to that shown in FIGS. 5-7 and will sometimes be referred to herein as perpendicular bisector elements.

The element 174 has a pair of tetragonal faces 180A and 180B which intersect to define a substantially perpendicular angle which has a bisector 182. The bisector 182 intersects the base 171 at an angle, other than substantially 90°. The angle, Beta, is the angle between a line perpendicular to the base 171 and the bisector 182. Elements such as these will sometimes be referred to as canted bisector elements.

A retroreflective material designed to have improved angularity may include elements, some or all of which are canted bisector elements such as element 174. The angle, Beta, can, for example, be the same angle for all of the elements, can be varied randomly, can be varied uniformly, or can be designed in a number of repeating or random patterns for the particular end use.

To produce retroreflective material of the present invention which includes canted bisector elements, a master mold is made by cutting a first groove with an approximately 90° included angle tool. The 90° included angle tool is angularly symmetric (45° of the groove on each side of the perpendicular) for some cuts (perpendicular bisector elements) and positioned at varying degrees of asymmetry for others (canted bisector elements).

The angle, Beta, or the angle from the perpendicular at which the bisector is canted, is typically about 0° to <45° and preferably about 0° to 35°.

The amount of cant of the bisector corresponds to the increase in angularity in the direction of the cant.

To produce either canted or perpendicular bisector materials, after the mold is cut it then serves as a master mold for the manufacture of negative molds. Duplicates of the master mold can be made from the negative molds by electroforming or other well-known techniques for mold duplication. A transparent plastic film or sheet may then be pressed against the duplicate mold or die to form or emboss in the film or sheet the pattern of the master mold. Alternatively, a liquid film forming material could be cast onto the mold. By controlling the depth of the impression on the plastic film or sheet, the base portion of the film or sheet which does not receive the mold impression then serves as a transparent cover sheet for the resulting retroreflective material.

In the next step of fabrication, the composite of reflecting elements and transparent cover sheet is preferably backed with a layer of material to strengthen the composite and to protect the reflective elements from dirt and moisture. Typically, the backing layer is an opaque thermoplastic film or sheet, preferably one having good weathering properties. Suitable materials typically have thicknesses about equal to the thickness of the reflecting elements. Other thicknesses are also suitable, depending on the degree of flexibility desired.

The backing film or sheet may be sealed in a grid pattern or in any other suitable configuration to the reflecting elements. Sealing may be effected by use of a number of methods, including ultrasonic welding, adhesives, or by heat sealing at discrete locations on the array of reflecting elements (see, for example, U.S. Pat. No. 3,924,928). Sealing is important to prevent entry of soil and moisture and to preserve the air spaces around the cube corner reflecting surfaces. For durability, it is desirable to cover the metal layer with a protective, typically polymeric, layer.

If desired, the retroreflecting elements may be metalized. If the elements are metalized the air spaces around the elements are not important, as the metal reflects the light.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any substrate without the added step of applying an adhesive or using other fastening means.

GLOSSARY OF TERMS

Groove Side Angle—The angle between the groove side and a plane extending parallel to the length of the groove and perpendicular to a plane defined by the bottom of the sets of grooves. Where the bottoms of the grooves are not co-planar, the plane of reference is the front side of the transparent surface layer or the surface where light enters the retro-reflective material.

Reference Center—A point on or near a retroreflector which is designated to be the center of the device for the purpose of specifying its performance.

Illumination Axis—A line segment from the reference center to the center of the illumination source.

Observation Axis—A line segment from the reference center to the center of the light receptor or viewer.

Observation Angle—The angle between the illumination axis and the observation axis.

Reference Axis—A designated line segment from the reference center which is used to describe the angular position of the retroreflector, and which for most articles, including sheet material of the invention, is a line perpendicular to the front surface of the article.

Entrance Angle—The angle between the illumination axis and the reference axis.

Presentation Angle—The dihedral angle between the entrance plane (formed by the illumination axis and the reference axis) and the observation plane (formed by the illumination axis and the observation axis).

Datum Mark—A mark on the retroreflector that is used to indicate the orientation of the retroreflector with respect to rotation about the reference axis.

Observation Half-Plane—The half-plane that originates on the illumination axis and which contains the observation axis.

First Axis—An axis through the reference center and perpendicular to the observation half-plane.

Second Axis—An axis through the reference center and perpendicular to both the first axis and the reference axis.

Rotation Angle—The dihedral angle from the half-plane originating on the reference axis and containing the positive part of the second axis (i.e., the part of the second axis that is in the observation half-plane) to the half-plane originating on the reference axis and containing the datum mark. Note that the rotation angle and presentation angle represent the same motion when the datum mark is aligned vertically with the reference center of the article, the receptor or viewer is aligned vertically with the illumination axis, and the illumination axis is perpendicular to the front surface of the article. Sheeting of the invention having improved rotational symmetry is of advantage since it minimizes the differences in divergence profile caused by mounting the sheeting in different angular orientations.

Viewing Angle—The angle between the observation axis and the reference axis.

Divergence Profile—A polar plot of retroreflective intensity as a function of observation angle on the r coordinate and presentation angle on the theta coordinate.

Observation Profile or Viewing Profile—A polar plot similar to that for the divergence profile but which defines the range of viewing positions contemplated for a viewer with respect to a retroreflective article of the invention. Ideally, the divergence profile for a retroreflective article would match the contemplated observation or viewing profile.

The term divergence profile is generally used herein when emphasis is on the pattern of light as it leaves the reflector, while the term observation or viewing profile is generally used when emphasis is on the perception of light by a viewer.

What is claimed is:

1. A retroreflective material comprising a transparent surface layer having a front side and a back side and an array of cube corner reflective elements, each of said reflecting elements including:
   (a) a rectangular base on the back side of the surface layer,
   (b) two rectangular faces approximately perpendicular to each other, each one being joined to an edge of the rectangular base to form a reflecting element having a triangular cross section; and
   (c) two triangular faces that are approximately parallel to each other and approximately perpendicular to said rectangular faces, and
   forming the ends of the reflecting elements; said triangular and said rectangular faces defining a pair of cube corners therebetween; said reflecting elements being formed by two approximately perpendicular sets of parallel grooves, a first set of V-shaped grooves, and a second-set of grooves having a pair of faces nearly perpendicular to said rectangular base, at least one of the sets of grooves including more than one groove having a groove side angle that differs from another groove side angle of the same set by a small amount less than 3°, whereby the array of cube corner retroreflective elements is characterized by small variations in at least one of the dihedral angles between the faces from one reflecting element to another, said variations existing in at least some but not necessarily all of the reflecting elements.

2. The retroreflective material of claim 1 wherein the differences in groove side angles occur in a repeating pattern, whereby the array of cube-corner retroreflective elements is divided into repeating sub-arrays that each comprise a plurality of cube-corner retroreflective elements in a plurality of distinctive shapes that retroreflect incident light in distinctively shaped light patterns.

3. The retroreflective material of claim 1 in which both sets of grooves include more than one groove having a groove side angle that differs from another groove side angle of the same set.

4. The retroreflective material of claim 3 wherein the differences in groove side angles occur in a repeating pattern, whereby the array of cube-corner retroreflective elements is divided into repeating sub-arrays that each comprise a plurality of cube-corner retroreflective elements in a plurality of distinctive shapes that retroreflect incident light in distinctively shaped light patterns.

5. The retroreflective material of claim 1 which further comprises a backing layer sealed to the back of the retroreflective material.

6. The retroreflective material of claim 1 wherein the groove side angle differs by an amount less than 1°.

7. The retroreflective article of claim 2 in which the cube-corner retroreflective elements of the array of elements are arranged in pairs of elements, so that each distinctively shaped element is matched by a similarly shaped element rotated 180 degrees from the first element.

8. A retroreflective material comprising a transparent surface layer having a front side and a back side and an array of cube corner reflecting elements, each of said reflecting elements including:
   (a) a rectangular base on the back side of the surface layer;
   (b) two mutually substantially perpendicular rectangular faces, each one being joined to an edge of the rectangular base to form a reflecting element having a triangular cross section, and
   (c) two substantially parallel triangular faces perpendicular to said rectangular faces;
   said triangular and rectangular faces defining a pair of cube corners therebetween, each pair of said rectangular faces defining an angle of intersection having a bisector which intersects said base, said bisector forming an angle Beta with a line perpendicular to said base, said reflective material including perpendicular bisector elements, wherein Beta is substantially zero, and canted bisector elements wherein Beta is about 0° to less than 45°.

9. The retroreflective material of claim 8 wherein said canted bisector elements each have an angle Beta which is substantially the same angle.

10. The retroreflective material of claim 8 wherein the angle Beta for each of said canted bisector elements varies randomly.

11. The retroreflective material of claim 8 wherein the angle Beta for each of said canted bisector elements varies in a uniform pattern.

12. A retroreflective material comprising a transparent surface layer having a front side and a back side and an array of cube corner reflecting elements, each of said reflecting elements including:
   (a) a rectangular base on the back side of the surface layer;
   (b) two approximately mutually perpendicular rectangular faces, each being joined to an edge of the rectangular base to form a reflecting element having a triangular cross section, and
   (c) two triangular faces that are approximately parallel to each other and approximately perpendicular to said rectangular faces;
   said triangular and rectangular faces defining a pair of cube corners therebetween; said reflecting elements being formed by two perpendicular sets of parallel grooves, a first set of V-shaped grooves, and a second set of grooves having a pair of faces nearly perpendicular to said rectangular base, at least one of the sets of grooves including more than one groove having a groove side angle that differs from another groove side angle of the same set by a small amount less than 3°, whereby the array of cube corner retroreflective elements is characterized by small variations in at least one of the dihedral angles between the faces from one reflecting element to another, said variation existing in at least some but not necessarily all of the reflecting elements; each pair of said rectangular faces defining an angle of intersection having a bisector which intersects said base, said bisector forming an angle Beta with a line perpendicular to said base, said reflective material including perpendicular bisector elements wherein Beta is substantially zero and canted bisector elements wherein Beta is about 0° to less than 45°.

13. The retroreflective material of claim 12 wherein the differences in groove side angles occur in repeating patterns.

14. The retroreflective material of claim 13 wherein said canted bisector elements each have an angle Beta which is substantially the same angle.

15. The retroreflective material of claim 12 which further comprises a backing layer sealed to the back of the retroreflective material.

16. A method for preparing a tool from which cube-corner retroreflective articles are formed comprising forming in tool stock at least two sets of a plurality of parallel grooves that define at least some lateral faces of the cube corner elements; the grooves within at least one set being formed with variation in the groove side angles from one groove to the next groove by a small amount, said variation existing among a plurality of the grooves within the set.

17. The method of claim 16 wherein said variation in groove side angles occurs in a repeating pattern.

18. The method of claim 17 in which a groove side angle of some repeated grooves across the set of grooves is varied to an angle greater than the angle required to provide orthogonal cube-corner elements, and a groove side angle in other repeated grooves across the set of grooves is varied to an angle less than the angle required to provide orthogonal cube-corner elements.

19. The method of claim 17 wherein one of the sets of grooves comprises V-shaped grooves and another set, formed perpendicular to said first set of grooves, comprises grooves having a right angle channel cross section having walls approximately perpendicular to the bottom of the groove.

20. The method of claim 16 which further comprises forming a third set of a plurality of parallel grooves which intersect the other two sets of grooves at the points where they intersect, forming a multiplicity of common points of intersection among the three sets of grooves, said third set of grooves partly defining the cube corner elements, in conjunction with the other grooves.

21. A method for preparing a tool from which cube-corner retroreflective articles are formed comprising configuring the surface of tool stock with a surface that defines an array of cube corner retroreflective elements to be included in the article, the configured surface including at least one set of parallel V-shaped grooves that define at least some lateral faces of the cube corner elements of the article, at least a plurality of the groove side angles of the set being varied to angles different by predetermined amounts from the angles required to provide orthogonal cube corner elements.

22. The method of claim 21 wherein the configured surface includes a second set of grooves perpendicular to the first set of grooves, the second set of grooves having a right angle channel cross-section having walls approximately perpendicular to the bottom of the groove, at least a plurality of the groove side angles of the second set being varied to angles different by predetermined amounts from the angles required to provide orthogonal cube corner elements.

23. The method of claim 21 wherein the configured surface includes two other sets of parallel V-shaped grooves, all three sets interacting so as to define cube corner retroreflective elements, and at least a plurality of the groove side angles of the second and third sets being varied to angles different by predetermined amounts from the angles required to provide orthogonal cube corner elements.

* * * * *

UNITED STATES PATENT AND TRADEMARK OFFICE
CERTIFICATE OF CORRECTION

PATENT NO. : 4,938,563

DATED : July 3, 1990

INVENTOR(S) : John C. Nelson, et al.

It is certified that error appears in the above-identified patent and that said Letters Patent is hereby corrected as shown below:

In Column 7, Line 57, "e.g." should read --i.e.--.

In Column 7, Line 65, "arcminute" should read --arc-minute--.

Signed and Sealed this

Fifth Day of November, 1991

Attest:

HARRY F. MANBECK, JR.

Attesting Officer

Commissioner of Patents and Trademarks